Sept. 30, 1947.          DE VERE V. CARTER              2,428,142
                   DOUBLE PINION APPLICATION OF POWER
                       Filed Feb. 8, 1943          4 Sheets-Sheet 1

INVENTOR.
DE VERE V. CARTER
BY
Lester B. Clark
ATTORNEY.

Sept. 30, 1947.  DE VERE V. CARTER  2,428,142
DOUBLE PINION APPLICATION OF POWER
Filed Feb. 8, 1943  4 Sheets-Sheet 2

INVENTOR.
DE VERE V. CARTER
BY Lester B. Clarke.
ATTORNEY.

Sept. 30, 1947. DE VERE V. CARTER 2,428,142
DOUBLE PINION APPLICATION OF POWER
Filed Feb. 8, 1943 4 Sheets-Sheet 3

INVENTOR.
DE VERE V. CARTER.
BY
Lester B. Clark.
ATTORNEY.

Patented Sept. 30, 1947

2,428,142

UNITED STATES PATENT OFFICE 2,428,142

DOUBLE PINION APPLICATION OF POWER

De Vere V. Carter, Dallas, Tex.

Application February 8, 1943, Serial No. 475,157

13 Claims. (Cl. 74—219)

The invention relates to a mechanism for reducing the speed and applying the power from a power unit. In many present day operations it is desirable to transmit loads of considerable magnitude through gearing, chain drives or by belts and in applying power in order to transmit such a load in many instances the contact pressures between the parts are so large that lubrication of the parts becomes difficult, if not impossible, and it is therefore one of the objects of the invention to provide a mechanism whereby the contact area between the parts may be enlarged while still utilizing a simple and economical apparatus.

It is one of the objects of the invention to provide a mechanism wherein two points of contact are provided for application of power from a driving to a driven member.

Another object of the invention is to provide in combination with a speed reducing mechanism the feature of a distribution of the point of application of the power so that no excessive load will be applied at any one point.

Another object of the invention is to provide a double pinion arrangement for contacting a driven member so that the load can be applied from opposite sides of the driven member to create a torque couple.

Another object of the invention is to provide in combination with a well pumping unit a source of power whereby the pressure to move the load can be applied at a plurality of points.

Another object of the invention is to provide a chain driven double pinion power unit wherein adjustment is possible for the sprocket gears so as to equalize the load being applied and to keep the chain equalized and taut at all times.

Another object of the invention is to provide in combination with a double pinion unit for the transmission of power of a equalizer unit for the V belt directed from the source of power to each individual unit.

Another object of the invention is to provide a self-equalizing belt tightener for pumping unit where there is a double application of power.

Still another object of the invention is to provide an adjustment device for the chain sprockets where there is a double application of power whereby the adjustment of the sprockets may be accomplished manually, hydraulically, or mechanically.

Other and further objects of the invention will be readily apparent when the following description is considered in connection with the accompanying drawings, wherein.

The present application is a continuation in part from my earlier filed application, Serial No. 156,380, filed July 29, 1937, which is maturing into Patent 2,310,393, dated February 9, 1943, in which the double application of power by means of gears and sprockets has been claimed.

It is intended that the present application shall obtain the benefit of the filing date of my earlier application insofar as all common subject matter is concerned.

Figure 1:
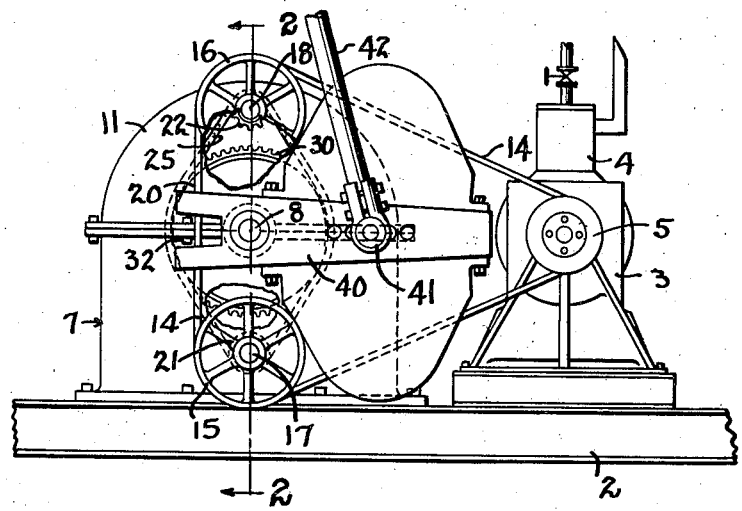
Fig. 1 is a side elevation of a counterbalanced pumping unit to which the invention has been applied.

In Fig. 1 a pumping unit assembly has been illustrated as embodying a base 2 upon which a power unit 3 has been mounted. In this particular instance an internal combustion engine 4 has been illustrated but it is to be understood that any source of power may be utilized for turning the wheel or sheave 5.

The housing 7 encloses the crank shaft 8 and carries the bearings 9 which support such crank shaft and encloses the mechanism for partially reducing the speed of the power unit. This housing 7 is completely enclosed and includes the cap portion 11.

In order that the power may be transmitted from the unit 3 to the crank shaft 8 a series of connections have been made which are best seen in side elevation in Fig. 1 and include the multiple belt connection 14 which passes around the wheel or sheave 5 and around the pinion wheels 15 and 16, which are mounted upon the shafts 17 and 18, respectively. These shafts are in turn carried in bearings 19 in the housing 7 so that the wheels 15 and 16 are rotatable with respect to the housing. It should be particularly noted that the belt 14 assumes a triangular configuration due to the positioning of the three wheels 5, 16 and 17. Any desired number of belts may be applied to these wheels in order to transmit the intended load.

Figure 2:
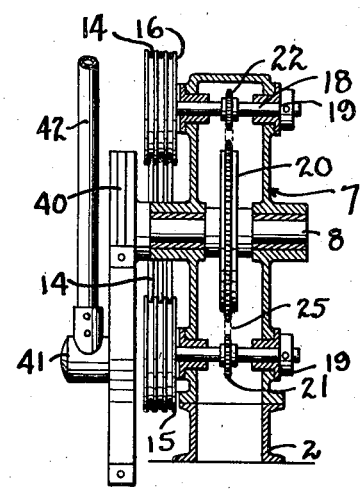
Fig. 2 is a section taken on the line 2—2 of Fig. 1 and looking in the direction of the arrows with the counterbalance dropped down to a vertical position.

Inside of the housing 7 is the drive wheel 20, which is affixed to the crank shaft 8. This wheel is considerably larger than the pinion wheels or sprockets 21 and 22 which are carried on the shafts 17 and 18, respectively. As seen in Figs. 1 and 2, the wheels 20, 21 and 22 are sprockets which are arranged to receive the chain 25. The relative size of the pinion sprockets and drive sprocket is such that there is a substantial reduction in speed between the rates of rotation.

With pumping units of the type illustrated in Figs. 1 and 2 it has become necessary with the advent of the deeper wells to transmit tremendous loads with a unit of this sort in order to effect reciprocation of the pump, the sucker rods and the column of oil in the well.

It is well known that a chain and sprocket drive connection can transmit only a predetermined load depending upon the size and configuration of the teeth and the chain; that a predetermined pressure can be transmitted by a tooth and chain connection and when this pressure is exceeded the lubricant will be expelled from between the parts and undue and excessive wear will immediately result so that the parts when overloaded will not render satisfactory service.

With the foregoing in view particular attention is directed to the arrangement of the sprockets 20, 21 and 22 in that the pinions 21 and 22 are positioned on opposite sides of the sprocket and power is applied from the power unit 3 to both of these pinions by virtue of the belts 14 passing over the wheels 15 and 16. When the chain 25 is passed over these two sprockets and the drive sprocket it seems obvious that a torque couple is provided which tends to rotate the sprocket 20 by exerting a pull on opposite sides thereof. Thus, if the wheel 5 is rotated in a counter-clockwise direction the wheels 15 and 16 would be similarly rotated, so that there would be a pull from the sprocket 22 on the right hand side 31 of the drive sprocket 20. Similarly as the sprocket 21 is rotated in a counter-clockwise direction, there would be a pull on the left hand side 32 of the drive sprocket 20, so that in effect the chain would be divided into four segments between its contacts with the pinions and the drive sprocket.

The alternate segments on the upper right hand side and the lower left hand side would be under tension tending to rotate the drive sprocket while the other two segments would not carry any load. The net result of this arrangement is that there are two contacts with the drive sprocket 20 so that the power is applied on opposite sides thereof in the nature of a couple, which tends to rotate the drive sprocket and, due to the double contact, reduces the individual sprocket tooth pressure which is applied at any one point and results in an even distribution of the pressure rather than a concentration of it at one point. This distribution of pressure equalizes the thrust on the crank shaft bearings 9.

The crank shaft 8 may be provided with a counterbalance such as 40 which has a wrist pin 41 and a pitman rod 42 connected thereto. It is by means of this pitman rod 42 that the walking beam and pumping mechanism in the well will operate as will be apparent from Fig. 5.

Figure 4:
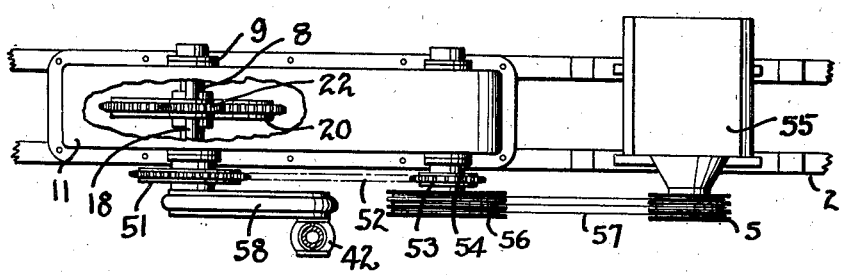
Fig. 4 is a top plan view looking down on the construction of Fig. 3.
Figure 3:
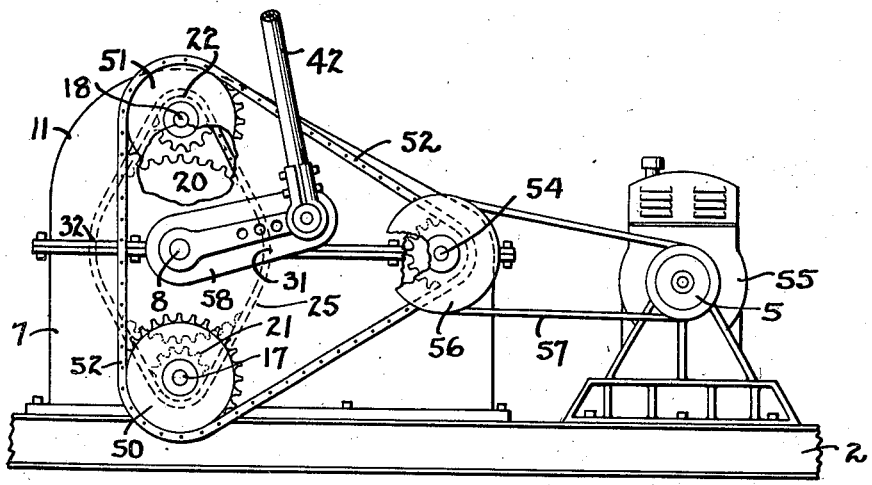
Fig. 3 is a side elevation of another application of the invention as applied to a pumping unit for wells in combination with a speed reducing mechanism.

Figs. 3 and 4 show another form of the invention which is somewhat similar to that shown in Figs. 1 and 2, except that the wheels 15 and 16 have been replaced with sprocket pinions 50 and 51 which receive the drive chain 52. This drive chain also passes around a driven sprocket 53 which is mounted on a shaft 54 carried by the housing 7. This construction is utilized when it is desired to further reduce the speed of rotation of the power unit such as 55.

The driven sprocket 53 is rotated by means of the wheel 56 which carries the multiple belt 57 which, in turn, passes over the wheel 5 which is driven by the power unit. With this construction there is a positive drive to the pinion sprockets 50 and 51 and there is a reduction in speed prior to the application of the power to the driven sprocket 53.

The internal sprockets in this form of the invention in Fig. 3 and Fig. 4 are the same as previously described in connection with Figs. 1 and 2 and the same reference characters have been used to designate the parts. A standard form of crank 58 is shown as connected to the pitman 42 in Fig. 3. It is to be understood that a counterbalance may or may not be applied to a construction of this sort. Particular attention is directed to the compact arrangement of the driven sprocket 53 and the wheel 56 so that the transmission of the power is in as nearly a straight line as possible to prevent excessive thrust upon the bearings.

Figure 6:
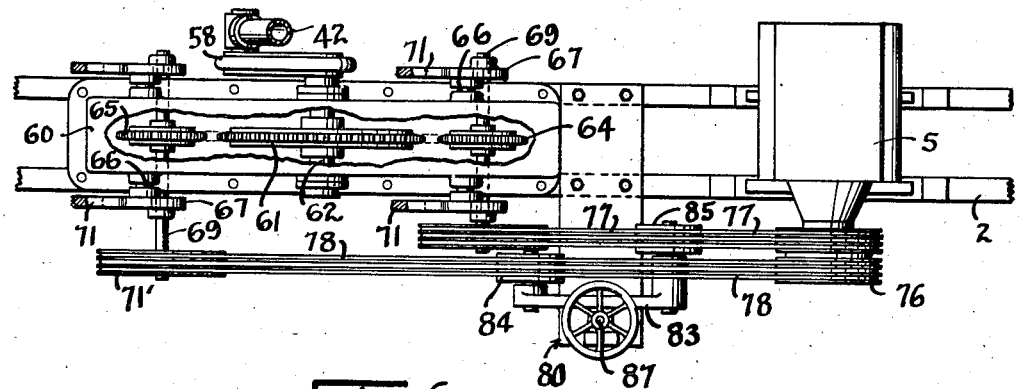
Fig. 6 is a top plan view looking down on the construction of Fig. 5.
Figure 5:
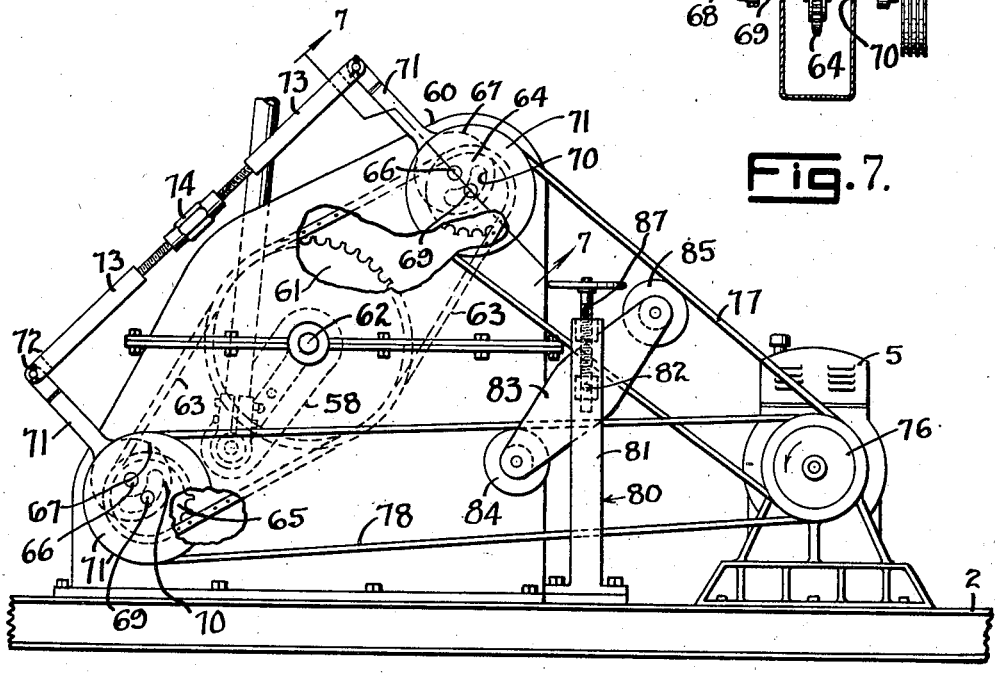
Fig. 5 is a side elevation of another form of the invention where some of the driving belts are directed to each of the sprockets and there is adjustment for the sprocket to equalize the chain.

Figs. 5 and 6 show another modified form of the invention where the base or skid 2 and engine 5 are the same as previously described.

The housing 60 is of a peculiar construction however in order to accommodate the main gear 61 mounted on the main shaft 62 and caused to rotate by the movement of the chain 63. This chain passes around the chain gear 61 and over the chain sprockets 64 and 65 which are shown on the opposite sides of the main shaft 62 in a diagonal direction.

Figure 7:
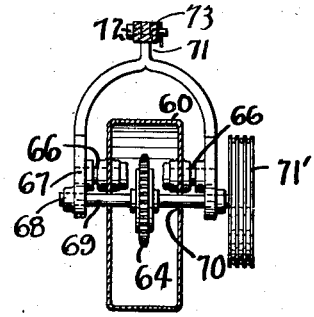
Fig. 7 is a section taken on the line 7—7 of Fig. 5.

Figs. 6 and 7 show the mounting arrangement for the sprockets 64 and 65 in order that adjustment may be had thereof to equalize the stresses on the chain drive 63 and in order to maintain the desired tension in the chain. This construction embodies the mounting of a shaft 66 on each side of the housing 60. Each of these shafts 66 carries a head 67. Each head forms a bearing 68 for the sprocket shaft 69 which is capable of movement in a slot 70 provided in the housing. The belt drive wheel 71 is mounted on the end of each of the sprocket shafts 69 so that rotation can be imparted to the sprocket.

Each head 67 has a lever or arm 71 thereon which projects laterally and which is arranged for connection by the pivot 72 to the adjustable brace 73. This brace couples the two heads together so that they can be adjusted relative to each other. This brace carries a turn buckle 74 which will move the arms 71 toward and away from each other, depending upon the direction of turning of the buckle due to the right and left hand threads on each portion of the brace 73.

This adjusting feature effects a turning of each of the heads about the shaft 66 which, in turn, moves the shafts 69 relative to each other and toward and away from the chain gear 61. In this manner any desired adjustment of the chain relative to the sprockets and main chain gear can be accomplished. If desired this mechanism can be locked to the housing in any particular manner so as to maintain any set adjustment.

The power is transmitted from the engine or motor 5 due to the rotation of the main drive wheel 76 and it will be noted that there are two sets of belts, the upper set of belts passing over the belt wheel 71' and the lower set of belts 78 passing over the lower belt wheel 71'. As many belts may be provided as is contemplated will be necessary to transmit the load and if desired alternate belts may go to the upper and lower drives respectively. In this manner the two drive wheels and sprockets will be driven uniformly from the same source of power and equal power in this manner applied to the chain at each end.

In order to equalize the belts and maintain them in a taut position so as to obtain the most efficient drive, a belt equalizer 80 has been provided which includes the standard 81, which carries a pivot shaft 82 upon which the balance arm 83 is mounted. This balance arm carries a belt wheel 84 to engage the lower set of belts 78 and an additional idler wheel at 85 to engage the upper set of belts. The fact that this arm is pivoted on a shaft causes it to balance itself between the belts and to maintain an equal pressure on each set of belts. The pivot shaft 82 is adjustable vertically by the hand wheel and threaded spindle 87 which is mounted in the top of the standard 81. It seems obvious that the desired tension on both sets of belts can be equalized and determined by adjustment of the spindle 87.

Figure 8:
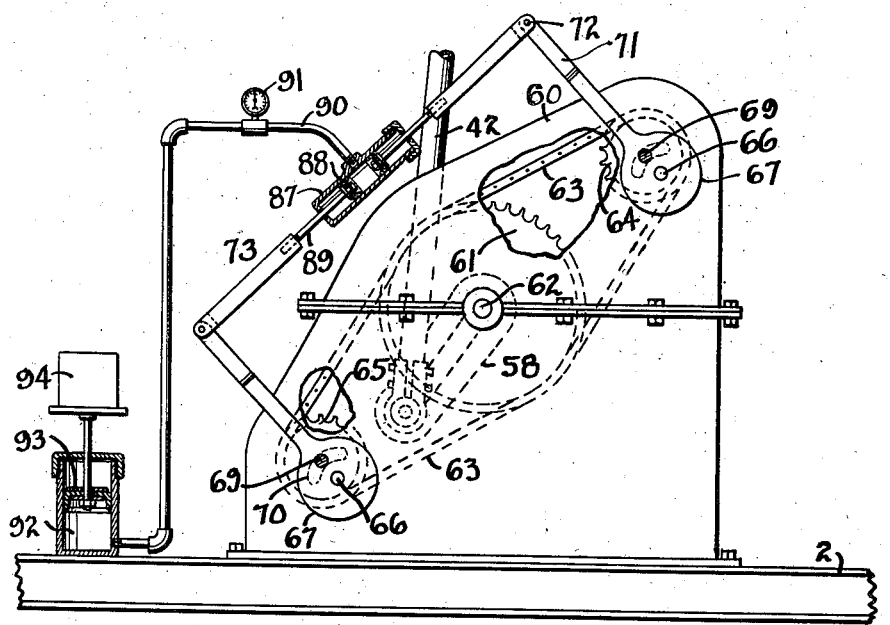
Fig. 8 shows a modified form of the chain adjustment construction wherein the adjustment is obtained hydraulically.

Fig. 8 shows a modified form of the adjustment for the tension on the drive chain 63, wherein the turnbuckle portion 74 in the brace 73 has been replaced by a cylinder 87 which carries the opposed pistons 88 which are, in turn, connected to the rods 89 attached to the opposite portions of the brace 73. A conduit 90 carrying a pressure gauge 91 is connected to the cylinder 87 between the opposed pistons 88 and leads to a reservoir 92 which will have a suitable liquid therein to be forced in between the pistons.

The desired pressure is maintained on this liquid by means of the plunger 93 normally forced downwardly against the liquid by a suitable weight 94. In this manner any desired pressure may be maintained on the pistons and the brace tending to move the sprockets 64 and 65 apart, attention being directed to the fact that the shaft 66 about which the heads 67 are to turn in this Fig. 8 form of the invention, are on the opposite side of the sprocket shaft 69, as compared with the form shown in Fig. 5. In Fig. 5, of course, the pulling together of the brace 73 tends to tighten the chain; whereas, in Fig. 8 the movement of the arm portions 71 away from each other tends to tighten the chain.

Figure 9:
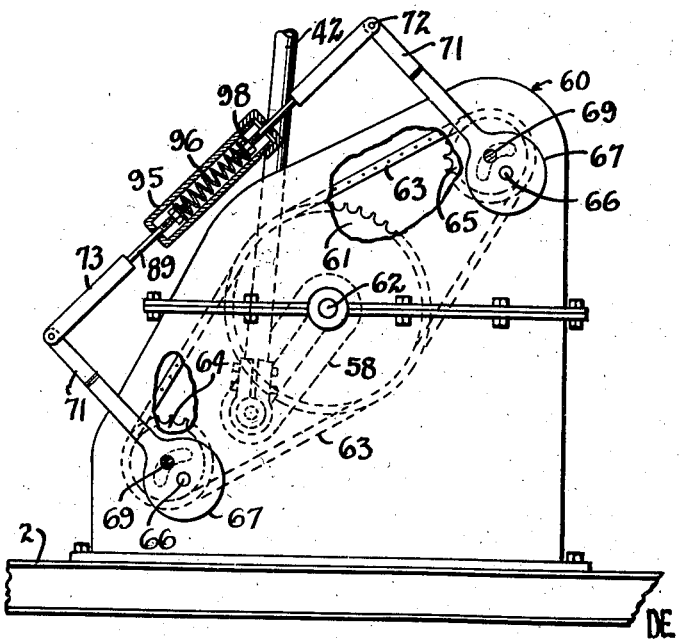
Fig. 9 shows still another modification of the chain adjustment where the adjustment is accomplished mechanically.

Fig. 9 shows another form of the adjustment wherein a cylinder 95 is provided with a compression spring 96 which normally urges the opposite parts of the brace 73 apart with a desired pressure. The nut portions at 98 tend to permit adjustment so that any desired pressure can be maintained in the opposite arms 71.

Broadly the invention contemplates a chain driven unit where the pressure is applied at more than one location. While two driving sprockets have been shown, it seems obvious that additional sprockets may be provided. In this combination the invention also contemplates adjustment of the driving belts and the tension on the chain by the mechanisms shown and described.

What is claimed is:
1. A well pumping unit comprising a crank shaft, a counterbalance thereon, a drive sprocket on said shaft, a housing, a pair of pinion sockets mounted in said housing on opposite sides of said drive sprocket, a chain drive connecting both said pinions to said drive sprocket, a multiple belt drive to simultaneously actuate both said pinion sprockets, and a power unit to drive said belt whereby the intermittent well and counterbalance loads are distributed to said power unit.

2. The combination of a power unit, a drive sheave thereon, a multiple belt driven by said sheave, a larger sheave driven by said belt, a chain sprocket driven by said larger sheave, a chain on said sprocket, a pair of larger pinion sprockets driven by said chain, a pair of smaller driven sprocket pinions driven by said larger pinion sprockets, a main drive sprocket, and a chain passing over both said smaller pinion sprockets and said main drive sprocket so that power is applied on opposite sides of said main drive sprocket whereby to reduce the contact pressure of the chain on the sprocket teeth.

3. A power driven speed reduction mechanism comprising a power unit, a multiple belt sheave thereon, a main driven shaft, a chain gear thereon, a driven chain on said gear, a pair of drive sprockets over which said chain passes and disposed so that said chain engages the chain gear at two locations, means including a multiple belt drive on said power sheave to simultaneously drive said sprockets to provide a dual application of power to said main shaft.

4. A power driven speed reduction mechanism comprising a power unit, a multiple belt sheave thereon, a main driven shaft, a chain gear thereon, a driven chain on said gear, a pair of drive sprockets over which said chain passes and disposed so that said chain engages the chain gear at two locations, means including a multiple belt drive on said power sheave to simultaneously drive said sprockets to provide a dual application of power to said main shaft, and additional means to adjust said sprockets to control the tension on said chain.

5. A power driven speed reduction mechanism comprising a power unit, a multiple belt sheave thereon, a main driven shaft, a chain gear thereon, a driven chain on said gear, a pair of drive sprockets over which said chain passess and disposed so that said chain engages the chain gear at two locations, means including a multiple belt drive on said power sheave to simultaneously drive said sprockets to provide a dual application of power to said main shaft, said first means including belts from said power unit sheave to each of said sprockets.

6. A power driven speed reduction mechanism comprising a power unit, a multiple belt sheave thereon, a main driven shaft, a chain gear thereon, a driven chain on said gear, a pair of drive sprockets over which said chain passes and disposed so that said chain engages the chain gear at two locations, means including a multiple belt drive on said power sheave to simultaneously drive said sprockets to provide a dual application of power to said main shaft, said first means including belts from said power unit sheave to each of said sprockets with alternate belts from the power sheave to each sprocket.

7. In a power reduction unit having a chain gear and a plurality of sprockets whereby a chain thereon applies a torque couple drive to said chain gear, a mechanism to equalize said chain including an eccentric support for each of said sprockets so as to move the sprockets toward or away from said chain gear.

8. In a power reduction unit having a chain gear and a plurality of sprockets whereby a chain thereon applies a torque couple drive to said chain gear, a mechanism to equalize said chain including an eccentric support for each of said sprockets so as to move the sprockets toward or away from said chain gear, and means to adjust said eccentrics.

9. In a power reduction unit having a chain gear and a plurality of sprockets whereby a chain thereon applies a torque couple drive to said chain gear, a mechanism to equalize said chain including an eccentric support for each of said sprockets so as to move the sprockets toward or away from said chain gear, and means to adjust said eccentrics including a brace and turnbuckle.

10. In a power reduction unit having a chain gear and a plurality of sprockets whereby a chain thereon applies a torque couple drive to said chain gear, a mechanism to equalize said chain including an eccentric support for each of said sprockets so as to move the sprockets toward or away from said chain gear, and means to adjust said eccentrics including a brace and a hydraulic pressure cylinder therein to extend said brace.

11. In a power reduction unit a main drive a plurality of driving members to apply power to said main drive at a plurality of circumferentially spaced locations, a multiple belt drive for each of said driving members, equalizer means engaging both of said multiple belts, and means to adjust said means to determine the tension on said belts.

12. In a power reduction unit a main drive a plurality of driving members to apply power to said main drive at a plurality of circumferentially spaced locations, a multiple belt drive for each of said driving members, equalizer means engaging both of said multiple belts, and means to adjust said means to determine the tension on said belts, said device including a pivot arm and an adjustable support therefor.

13. In a double application of power speed reducer unit having a main chain gear and a pair of spaced drive sprockets to drive a chain contacting said chain gear at two spaced points, a mechanism to adjust the tension on said chain comprising an eccentric support for each sprocket, and means to adjust said eccentrics toward and away from the main chain gear, said mechanism and means including an extensible and contractible brace member.

DE VERE V. CARTER.

REFERENCES CITED

The following references are of record in the file of this patent:

UNITED STATES PATENTS

| Number | Name | Date |
|---|---|---|
| 807,048 | Ronan | Dec. 12, 1905 |
| 403,598 | Larson | May 21, 1889 |
| 1,034,242 | Johnson | July 30, 1912 |